US005498876A

United States Patent [19]
Moscovitch

[11] Patent Number: 5,498,876
[45] Date of Patent: *Mar. 12, 1996

[54] NEUTRON SPECTROMETER, REAL-TIME DOSIMETER AND METHODOLOGY USING THREE-DIMENSIONAL OPTICAL MEMORY

[75] Inventor: Marko Moscovitch, Potomac, Md.

[73] Assignee: Georgetown University, Washington, D.C.

[*] Notice: The term of this patent shall not extend beyond the expiration date of Pat. No. 5,319,210.

[21] Appl. No.: 240,933

[22] Filed: May 10, 1994

Related U.S. Application Data

[63] Continuation-in-part of Ser. No. 974,207, Nov. 10, 1992, Pat. No. 5,319,210.

[51] Int. Cl.$^6$ ........................ G01T 1/00
[52] U.S. Cl. .............. 250/474.1; 250/472.1; 250/473.1
[58] Field of Search ............ 250/474.1, 473.1, 250/472.1

[56] References Cited

U.S. PATENT DOCUMENTS

| | | | |
|---|---|---|---|
| 4,288,861 | 9/1981 | Swainson et al. | 365/127 |
| 4,983,843 | 1/1991 | Thomson | 250/370.02 |

OTHER PUBLICATIONS

Parthenopoulos et al., "Three–Dimensional Optical Storage Memory, Department of Chemistry", Science, vol. 245 (1989).
Stein, "Terabyte Memories with the Speed of Light", BYTE (1992).
Bolch et al., "A Method Of Obtaining Neutron Dose And Dose Equivalent From Digital Measurements And Analysis Of Recoil–Particle Tracks", Health Physics, vol. 53, No. 3, pp. 241–253, 1987.
Davis, "Use of Computer Memory Chips As The Basis For A Digital Albedo Neutron Dosimiter", Health Physics, vol. 49, No. 2 (1985).
Hunter et al., "Potentials of two–photon based 3–D optical memories for high performance computing", Applied Optics, vol. 29, No. 14, 10 May 1990.
Hankins et al., "Preliminary Study On The Use Of The Track Size Distribution On Electrochemically Etched R–39 Foils To Infer Neutron Spectra", Radiation Protection Dosimetry, vol. 20, No. 1/2, pp. 109–112, (1987).
Moscovitch, "Dosimeters For Measuring Neutron Dose Equivalent: New Approaches", Invited Paper. In The Proceedings Of The Eleventh DOE Workshop On Personnel Neutron Dosimetry, Las Vegas, NV, Jun. 4–7, 1991.
Griffith, "Review Of The State Of The Art In Personnel Neutron Monitoring With Solid State Detectors", Radiation Protection Dosimetry, vol. 23, No. 114, pp. 155–160 (1988).
Lund et al., "Neutron Dosimeter Using A Dynamic Random Access Memory As A Sensor", IEEE Transactions on Nuclear Science, vo. 33, No. 1, (1986).
R. M. MacFarlane, "Photon–Gated Spectral Holeburning" Journal of Luminescence 38 (1987).

(List continued on next page.)

*Primary Examiner*—Constantine Hannaher
*Attorney, Agent, or Firm*—Renner, Otto, Boisselle & Sklar

[57] ABSTRACT

A dosimetry method, dosimeter and system characterized by the steps of storing information in a three dimensional optical memory element, then exposing the optical memory element to neutron or other high LET radiation to alter the information stored in the optical memory element as a function of the radiation to which the optical memory element is exposed, and then retrieving the altered information from the optical memory element for subsequent analysis. The altered information is used to provide a measure of both the radiation dose and energy. In a preferred embodiment, the optical memory device is a 3-D ORAM comprising a volume of a transparent polymer doped with a light sensitive chemical and, in particular, spirobenzopyran. Also disclosed are a spectrometer for monitoring neutron and other types of radiation, an electronic dosimeter for providing real time monitoring of radiation exposure, and associated methodologies, all based on use of an optical memory element.

17 Claims, 2 Drawing Sheets

OTHER PUBLICATIONS

Robert C. Bertelson, "Photochromic Process Involving Heterolytic Cleavage", in Techniques of Chemistry vol. III, Photochromism. (1971) pp. 45–55, 242–255.

McLaughlin, "VI: Films, Dyes, and Photographic Systems" in Manual on Radiation Dosimetry, pp. 129–177 (1970) pp. 129–177.

Malkin et al., "Photochemistry of Molecular Systems for Optical 3D Storage Memory", Research on Chemical Intermediates, vol. 19, No. 2, pp. 159–189 (1993).

Hinton, "How Neural Networks Learn from Experience", Scientific American (1992).

Coherent Brochure on DPSS 532, Coherent Inc. (1991).

NEUTRON SPECTROMETER, REAL-TIME DOSIMETER AND METHODOLOGY USING THREE-DIMENSIONAL OPTICAL MEMORY

RELATED APPLICATION DATA

This application is a continuation-in-part of application Ser. No. 07/974,207, filed on Nov. 10, 1992, now U.S. Pat. No. 5,319,210, issued Jun. 7, 1994, which application is hereby incorporated herein by reference.

FIELD OF INVENTION

The invention herein described relates generally to radiation dosimetry and, more particularly, to a neutron dosimeter and associated dosimetry method that allows precise neutron dose measurements. The invention also has application to other types of high linear energy transfer (LET) radiation such as protons, heavy ions, etc. and to microdosimetry, and various apparatus are disclosed.

BACKGROUND

The fraction of radiation dose from neutrons received by radiation workers is increasing as a result of growth in the nuclear power industry, the development of nuclear reactor technology, and the potential use of neutrons for radiotherapy. Unfortunately, neutron dosimetry has been a difficult problem due to low neutron sensitivity and energy dependence of existing dosimetry methods. Prior art neutron dosimetry methods include thermoluminescence dosimetry (TLD), solid track detector methods using, for example, electrochemically etched CR-39 foil or NTA film, and fluid track detector methods using, for example, superheated bubble detectors (SSD).

The foregoing methods may not have the energy response and sensitivity necessary to meet the more exacting needs of neutron dosimetry. TLD suffers from high energy dependence, which may result in an error of as much as a factor of ten or more if the neutron energy spectrum is not known. NTA films have response functions that may cause even greater errors for many operational situations. Major unaddressed problems with CR-39 are the lack of sensitivity at low neutron energies, energy dependence and poor sensitivity at high energies. The more recently developed superheated drop detector has been shown to suffer from serious drawbacks including a fourfold reduction in the energy response at energies from 0.144 MeV to 5 MeV.

Other neutron dosimetry methods that have been proposed rely on electrical property changes, such as soft errors which arise in dynamic random access memories (DRAMs) through interaction with charged particles, particularly, alpha particles. For use as a neutron dosimeter, a converter is used to interact with the neutrons and generate protons or alpha particles. Accordingly, the overall performance of the neutron dosimeter is at least in part dependent on the performance of the converter which may be a foil layer applied to the DRAM. Moreover, a neutron/alpha converter has the disadvantage of increasing the dosimeter size and complicating the dose reading interpretation. In addition to the need for a converter, the material of the DRAMs is not tissue equivalent and there still remains the problem of energy dependence.

Neutron dosimetry is recognized as being a difficult problem in health physics. Recently there has been a reevaluation of the biological hazards associated with neutron exposure and, consequently, there is an urgent need for a neutron dosimetry method that provides precise neutron dose measurement over a wide range of neutron energies. More particularly, a need exists for a neutron dosimeter and dosimetry method that solves the two major unsolved problems of neutron dosimetry: (1) inability to measure the neutron energy which results in errors in estimating the dose equivalent and (2) poor sensitivity at high and low neutron energies. There is needed a neutron dosimeter that is sensitive at both high and low energies and is capable of characterizing the exposure energy spectrum, thereby to permit accurate neutron dose measurements.

SUMMARY OF THE INVENTION

The present invention satisfies the aforesaid need by taking an entirely new approach to neutron, and more generally high LET radiation, dosimetry that is characterized by the use of an optical memory device composed of a volume of material containing a photoactive substance wherein an energy induced three-dimensional inhomogeneity pattern may be produced and/or detected optically as by use of directed electromagnetic radiation. More particularly, the invention uses a two photon based, three-dimensional optical random access memory (3-D ORAM) that heretofore has been proposed as a memory device for computers wherein massive quantities, such as many gigabytes, of data is to be stored. The 3-D ORAM is a volume, typically a cube, of transparent polymer doped with a light sensitive chemical that can be written and read using two laser beams that simultaneously strike the material to alter at their intersection an optical characteristic of the material.

According to the invention, a dosimetry method comprises the steps of storing information in a three dimensional optical memory element, then exposing the optical memory element to neutron or other high LET radiation to alter the information stored in the optical memory element as a function of the radiation to which the optical memory element is exposed, and then retrieving the altered information from the optical memory element for subsequent analysis. More particularly, certain information is written on the optical memory element, which information becomes altered by exposure to the radiation. The altered information is later read from the optical memory and analyzed to provide a measure of both the radiation dose and energy.

In a preferred embodiment, the optical memory device is a 3-D ORAM comprising a volume of a transparent polymer doped with a light sensitive chemical and, in particular, spirobenzopyran. Binary information is stored in the ORAM by excitation of the photochronic chemical dopant molecule to a higher energy state using laser light. When the molecule absorbs simultaneously two photons, an optical characteristic thereof, such as color, changes and records a bit.

When neutron radiation interacts with the hydrogen and carbon composing the ORAM material, it will create energetic heavy ions. Those heavy ions will cause a local energy deposition and the resultant localized temperature increase will cause the excited or "written" molecule or molecules in the vicinity to revert to their lower energy or "unwritten state". In computer memory terminology, the interaction with neutron radiation will cause an error or errors to occur in the form of a bit flip or flips, i.e., a change from a written binary "1" state to an unwritten "0" state. The number of "errors" or "bit flips" will be related to the neutron dose, and therefore the dose can be calculated. The local energy deposition will also occur from interaction with other types of high LET radiation such as proton and heavy ion radiation.

In addition, the energy of the absorbed radiation may be determined from the spatial distribution of the bit flips in that neutrons (or other high LET particles) of different energies will produce different track structures in the ORAM. An energy measurement can be made by relating the radiation energy spectrum to the track structure produced by the interactions with the hydrogen and carbon atoms composing the ORAM. Once the energy is known, energy dependent quality factors can be applied to provide dose equivalent.

The present invention enables a sensitivity many orders of magnitude greater than the sensitivity afforded by existing neutron dosimetry methods at both high and low energies. This arises from the high storage and interaction density of ORAM which is $10^{12}$ bits/cm$^3$. Furthermore, conventional ORAMs useful in practicing the invention are composed of hydrogen and carbon atoms. This provides tissue equivalence while at the same time eliminating the need for, and the drawbacks associated with, an external alpha or proton radiator that heretofore was employed in neutron dosimetry. The present invention also is useful in practicing microdosimetry.

According to another aspect of the invention, there is provided a high LET dosimeter comprising a dosimeter element and a holder for said dosimeter element. The dosimeter element is formed by an optical memory device and the holder includes means whereby the holder may be worn by a person whose radiation dose exposure is to be monitored. In a preferred embodiment, the dosimeter element is removable from the holder so that it may be "read" in a reader intended for this purpose.

According to yet another aspect of the invention, there is provided a dosimetry reader comprising means for removably receiving an optical memory element that has been exposed to high LET radiation, means for retrieving information from the optical memory element, and means for analyzing the information retrieved from the optical memory element to provide a measure of radiation dose and/or neutron energy.

According to a further aspect of the invention, there is provided a dosimeter system comprising a dosimeter including an optical memory device for exposure to radiation, a reader for retrieving information from the optical memory device after exposure to radiation, and means for analyzing the retrieved information to provide a measure of radiation dose and/or energy.

According to still another aspect of the invention, there is provided a method for monitoring ionizing radiation exposure comprising the steps of storing information in a three dimensional optical memory element, then exposing the optical memory element to ionizing radiation to alter the information stored in the optical memory element as a function of the radiation to which the optical memory element is exposed, retrieving the altered information from the optical memory element, and analyzing the altered information retrieved from the optical memory element to extract radiation exposure information therefrom.

According to yet another aspect of the invention, there is provided a method of performing microdosimetry comprising the steps of storing information in a three dimensional optical memory element, then exposing the optical memory element to radiation to alter the information stored at a plurality of memory locations in the optical memory element through local interaction with the radiation to which the optical memory element is exposed, and retrieving the altered information from the optical memory element by reading the memory locations to determine the location of the memory locations that have been altered through local interaction with the radiation thereby to obtain a measure of the spatial distribution of radiation dose within the optical memory element.

The invention herein described also provides a spectrometer for monitoring neutron and other types of radiation, an electronic dosimeter for providing real time monitoring of radiation exposure, and associated methodologies, all based on an optical memory unit sensitive to the radiation being monitored. Preferred embodiments of the spectrometer and dosimeter are characterized a three dimensional optical memory element having a plurality of memory locations that may be written from a first energy state to a second energy state, and which memory locations become altered by reversion from their second energy state to their first energy state through localized interactions between incident radiation and molecules composing the optical memory element; means for reading the optical memory element to retrieve therefrom information altered through interaction with incident radiation; means for analyzing the altered information retrieved from the optical memory element to extract radiation dose information therefrom; and means for displaying the dose information extracted from the optical memory element. The means for analyzing preferably includes a neural network computer apparatus for determining the radiation energy as a function of the spatial distribution of the memory locations that have reverted to their first energy state.

The invention also provides a high LET radiation dosimetry method comprising the steps of storing information in a three dimensional optical memory element having a plurality of memory locations by exciting the memory locations from a first energy state to a second energy state; exposing the optical memory element to high LET radiation to alter the information stored in the optical memory element as a function of the radiation to which the optical memory element is exposed, the excited memory locations reverting from their second energy state to their first energy state through localized interactions between the radiation and molecules composing the optical memory element; retrieving the altered information from the optical memory element for subsequent analysis by reading the memory locations to determine the spatial distribution of the memory locations that have reverted to their first energy state; analyzing the altered information retrieved from the optical memory element to extract radiation dose information therefrom, said analyzing step including using a neural network computer apparatus for determining the radiation energy as a function of the spatial distribution of the memory locations that have reverted to their first energy state. Usually, the analyzing step further includes determining the radiation dose as a function of the number of the memory locations that have reverted to their first energy level.

The foregoing and other features are hereinafter described and particularly pointed out in the claims, the following description and the annexed drawings setting forth in detail illustrative embodiments of the invention, these being indicative, however, of but a few of the various ways in which the principles of the invention may be employed.

DETAILED DESCRIPTION

The neutron dosimetry method of the invention uses as a dosimeter an optical memory element composed of a volume of material containing a photoactive substance wherein an energy induced three-dimensional inhomogeneity pattern may be produced and/or detected optically as by use of directed electromagnetic radiation. The method generally comprises the steps of storing information in a three dimensional optical memory element, then exposing the optical memory element to neutron radiation to alter the information stored in the optical memory element as a function of neutron radiation to which the optical memory element is exposed, and then retrieving the altered information from the optical memory element for subsequent analysis. The steps are more fully described below as are details of a preferred optical memory element, devices and system useful in practicing the method.

A preferred optical memory element useful as a neutron dosimeter is a three dimensional optical random access memory (3-D ORAM) of the type previously proposed for use as a memory storage device in computers. A known 3-D ORAM is composed of a transparent polymer doped with a light sensitive chemical called spirobenzopyran. The spirobenzopyran molecules embedded in the polymer matrix have two isometric forms that change from one to the other in response to energy level changes stimulated by electromagnetic energy. 3-D ORAM elements composed of spirobenzopyran embedded in a polymer matrix may be obtained from the University of California, Irvine, Calif., where the 3-D ORAM was developed as reported in Parthenopoulos and Rentzepis, "Three-Dimensional Optical Storage Memory", *Science*, Vol. 245, 843–845 (1989). The spirobenzopyran molecule and its major properties are described in Bertelson, *Techniques of Chemistry: Photochromism*, Vol. 3, Wiley-Interscience, New York, 1971, p. 45.

The storage and retrieval of meaningful information in and from the ORAM may be effected by using a Nd:YAG solid state laser system to write and read information in a binary format provided by the two distinct forms of spirobenzopyran. The Nd:YAG laser produces both 532 nm and 1064 nm laser beams that are particularly useful in writing and reading the ORAM using two-photon absorption. Two-photon absorption is the excitation of a molecule to an electronic state of higher energy by the simultaneous absorption of two photons, and the physics thereof is further described in R. M. Macfarlane, *J. Lumin*, 38, 20 (1987).

Figure 1:
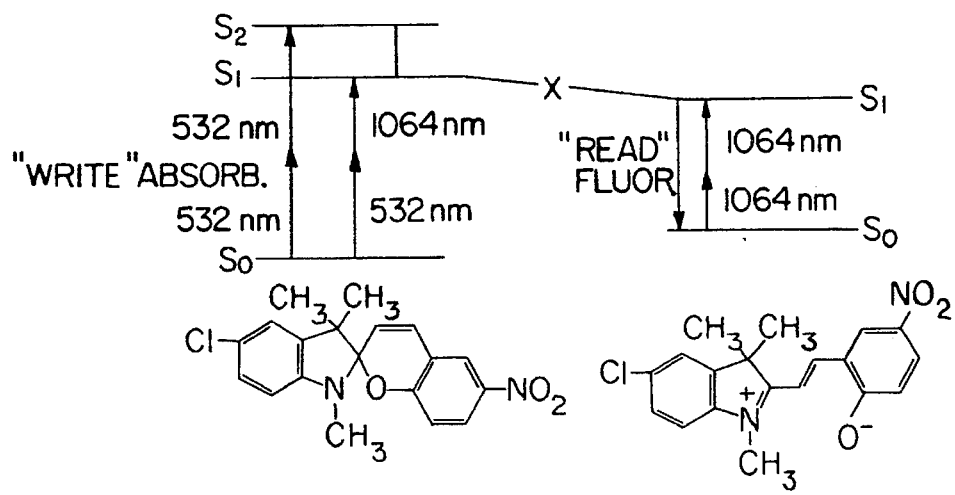
FIG. 1 (from Parthenopoulos and Rentzepis, *Science*, Vol. 245, 843 (1989)) is an energy level diagram of the "write" and "read" forms of the spirobenzopyran molecule in a polymer matrix.

When the spirobenzopyran molecule absorbs simultaneously two 532 nm photons, it changes color and records a "bit". As illustrated in FIG. 1, the first photon provides excitation to an intermediate virtual state and the second photon further excites the molecule to a stable excited state. Since the virtual state is unstable, both photons must overlap in both space and time for a transition to occur. In binary logic, the form at the left may represent a "1" and the form at the right may represent a "0".

The read operation also relies on the simultaneous absorption of two photons, but the two photons are of longer wavelengths. Two 1064 nm photons can be used to simultaneously excite the spirobenzopyran molecules. Only the molecules that have been written will absorb the longer wavelengths and emit fluorescence that may be detected using a sensitive optical detector array.

Figure 2:
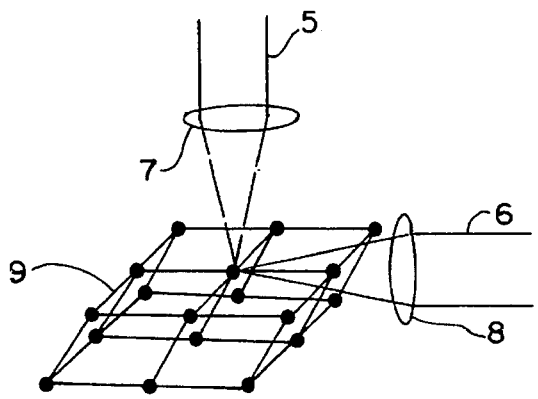
FIG. 2 (from Stein, *Byte*, March 1992, 168) is diagram showing a 3-D ORAM based on a two-photon process using two orthogonal laser beams.

Information may be written and read at selected locations within the ORAM by using two mutually orthogonal laser beams focussed to simultaneously excite an "addressed" molecule as depicted in FIG. 2. For writing a bit, two 532 nm beams are focussed at the addressed location within the volume of the ORAM thereby exciting the molecule to its higher energy state. For reading a bit, two 1064 nm beams are focussed at the addressed location and fluorescence is looked for to see if the addressed bit had been written. Erasing may be achieved by either light for erasing selected bits or by temperature for bulk erasure. As will be appreciated from the following description, erasure is not necessary as normally, for reuse, the entire ORAM is written to rejuvenate the ORAM for reuse as a neutron detector. Beam splitter and focussing optics may be used to provide the two laser beams that simultaneously strike the ORAM and write or read a bit at their intersection. For writing, it may prove to be preferable to use a weak 532 nm beam and a strong 1064 nm beam to avoid a potential complication arising from two-photon absorption being induced by each beam separately when two beams of equal wavelength are used.

Figure 3:
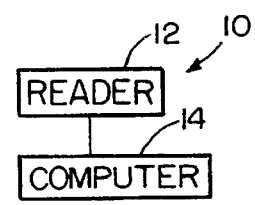
FIG. 3 is a diagrammatic illustration of a neutron dosimetry system according to the present invention.

For details of a system for writing and reading ORAM, reference may be had to Hunter et al., "Potentials of Two-Photon Based 3-D Optical Memories for High Performance Computing", *Applied Optics*, Vol. 29, No. 14, 10 May 1990, which is hereby incorporated herein by reference. The present invention may be practiced using any suitable hardware and associated software for implementing the herein described write and read functions. Moreover, the ORAM write/read equipment may have integrated therein or may be interfaced to a computer, such as a conventional programmable microcomputer, that performs the hereinafter discussed data analysis and control functions. FIG. 3 shows a representative system 10 including an ORAM dosimeter reader 12 and computer 14.

Figure 4:
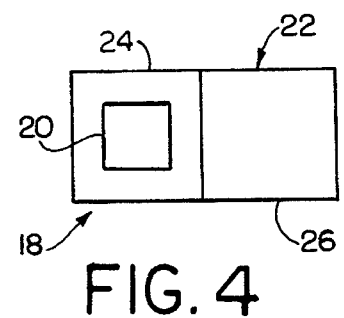
FIG. 4 is a diagrammatic illustration of a neutron dosimeter according to the invention.

According to the invention, an optical memory element, such as the above described ORAM, is used as the neutron sensitive element of a dosimeter 18. As diagrammatically depicted in FIG. 4, the ORAM 20 will typically be housed in a holder 22 for protection and to facilitate mounting at a monitoring site or wearing of the dosimeter on a person such as by clipping the holder to the user's clothes or by direct attachment to the user's body. The holder may be multi-component holder including, for example, a case 24 for the ORAM dosimeter element and a carrier 26 for the case. The case 24 should be opaque to light to avoid the possibility of non-neutron induced response in the ORAM dosimeter element. Depending on the nature of the hardware selected to write and read the dosimeter, the ORAM dosimeter element may need to be removable from the case and/or holder for placement in the write/read equipment. The carrier may include a clip or other attachment/wearing device.

The ORAM dosimeter element 20 is prepared for use by writing a bit at each memory location to be used for neutron dose monitoring. Preferably, all addressable memory locations are written to maximize the sensitivity of the ORAM. Once written the dosimeter element may be placed in the holder 22 and distributed or placed for monitoring exposure to neutrons. For example, the dosimeter may be worn by a person whose exposure to neutrons is to be monitored. The ORAM dosimeter will then be exposed to the same radiation as the person. After a prescribed period of time, the dosimeter is retrieved so that it may be read to extract therefrom radiation exposure information.

When neutron radiation interacts with the hydrogen and carbon composing the ORAM material, it will create energetic heavy ions. These heavy ions will cause an error to appear in the ORAM by local energy deposition in the vicinity of the exited molecule. The resulting temperature increase erases the written form of the molecule causing an error to occur in the form of a bit flip (a change of "1" to "0"). The measurable number of errors will be a function of and in principle proportional to the neutron dose. Accordingly, the absorbed neutron dose can be calculated as a function of the number of measurable errors. Absorbed dose is the primary physical quantity used in radiation dosimetry (often referred to simply as dose). Absorbed dose is defined as the energy absorbed per unit mass from any kind of ionizing radiation in any kind of matter.

Figure 5:
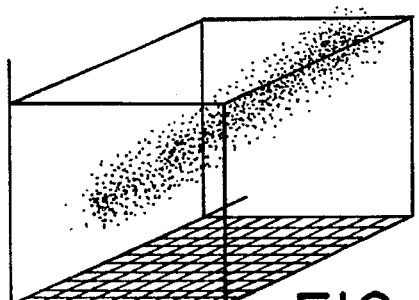
FIGS. 5 and 6 (from Bolch et al., *Health Physics*, Vol. 53, 241, 245–246 (1987)) are illustrations respectively showing simulated track structures produced by a 500 keV recoil proton and an 80 keV recoil C ion in gas.
Figure 6:
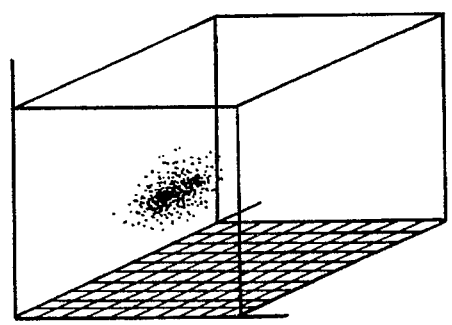

The neutron energy can be calculated from the structure of the ion tracks produced within the ORAM. By way of analogy, different recoil particles produce different track shapes in gas ionization chambers. FIGS. 5 and 6 show a significant difference in simulated track structure produced by a 500 keV recoil proton as compared to an 80 kev recoil C ion in gas. The distribution of the bit flips in the ORAM, and more particularly the bit-flip density distribution along the recoil charged particle tracks within the ORAM, will reveal the track structure distribution of the secondary charged particles produced by neutron interactions with the hydrogen and carbon atoms composing the ORAM. Accordingly, the functional relationship between the neutron energy and the spatial distribution of bit flips in the ORAM may be used to provide energy measurement. Once the energy is known, applying energy dependent quality factors provides the required dose equivalent. The quantity dose equivalent is used to allow for different biological effectiveness of different kinds of radiation for radiation protection purposes. The dose equivalent H is defined as the product of the absorbed dose D and a dimensionless factor Q, which depends on the type of radiation. For gamma rays, X-rays, electrons and positrons, the value of the quality factor is 1. For neutrons and heavy charged particles the quality factor is in the range of 2–20 depending of the energy and type of particle.

Algorithm development for a given ORAM dosimeter element may be approached in a manner similar to the method described in Bolch et al., "A Method of Obtaining Neutron Dose and Dose Equivalent From Digital Measurements and Analysis of Recoil-Particle Tracks", *Health Physics*, 53, 241–253 (1987), which is hereby incorporated herein by reference. A suitable algorithm may calculate the track length L of the recoil event by considering the two cells most likely to contain the true endpoints of the track, and the average diameter R of the track by performing three-dimensional scanning for bit-flip events in the neighborhood of the track axis. R and L may then be used to unfold neutron dose equivalent using predetermined relationships.

As will be appreciated by the reader, an improved neutron sensitivity is achieved by several orders of magnitude taking advantage of the high storage density of ORAM on the order of $10^{12}$ bits/cm$^3$ as compared to the storage density of $10^8$ bits/cm$^3$ for a conventional silicon based DRAM suggested in the literature for thermal neutron dosimetry. Moreover, ORAM, being composed of hydrogen and carbon atoms required for neutron interactions, provides tissue equivalence while eliminating the need for an external alpha or proton radiator often employed in neutron dosimetry. Alpha or proton radiators have the disadvantage of increasing the dosimeter size and complicating the dose reading interpretation.

Other Applications

Although the invention as thus far described has been in relation to neutron dosimetry, the principles of the invention can also be applied to other types of radiation and, in general, high linear energy transfer (LET) radiation such as protons, heavy ions, etc., and also to microdosimetry. As above discussed, neutron radiation interacts with the hydrogen and carbon of the ORAM material and creates energetic heavy ions which cause local energy deposition. This local energy deposition will also occur from interaction with other types of high LET radiation such as proton and heavy ion radiation.

In fact, the above described neutron dosimeter may require a filter to block high LET particles other than neutrons where their presence is of significance. For most dosimetric applications on earth this will normally not be a problem because protons and heavy ions typically will not be present in any significant quantity in most instances. The situation is different in space applications where high energy protons constitute the predominant form of high LET radiation.

Accordingly, the above described methodology, dosimeter and equipment can be used to perform high LET radiation dosimetry including, in particular, proton dosimetry. The only difference is that the incident radiation directly interacts with the ORAM material to effect localized heating rather than through creation of secondary particles that cause localized heating as in the case of neutrons. In either case, the resulting temperature increase erases the written form of the excited molecule causing a error to occur in the form of a bit flip as above described. Accordingly, the absorbed dose can be calculated as a function of the number of measurable errors. Also, the high LET radiation energy can be calculated from the structure of the high LET particle tracks produced within the ORAM. Moreover, the nature or specific form of these tracks may possibly be used to discriminate between different types of high LET radiation such as between protons and neutrons.

The invention can also be used to practice microdosimetry and, in doing so, overcomes a fundamental problem that plagued earlier microdosimetry techniques. Microdosimetry requires measurement of the microscopic distribution of dose in an irradiated solid body. Knowledge of how a body absorbs radiation locally is important to research on the biological effects of absorbed radiation. A problem in the past was that measurements couldn't be made inside the solid body. Because of this, researchers would use computer simulations or look at local effects in a gas and then extrapolate them to a solid body.

The present invention enables measurement of the distribution of dose inside a solid and, in particular, a solid that is tissue equivalent. The radiation induced "errors" can be read and mapped to provide a three-dimensional picture of the radiation distribution inside the ORAM.

Energy Determination Using A Neural Network

Neural networks are information processors inspired by the biological nervous system. They are computer-based simulation of living neurons (a nerve cell with all of its processes), which work fundamentally different than conventional computing. A neural network has the capability to learn from its own experience. Neural networks have been proven to be particularly useful for pattern recognition applications. Boone J. M., Sigillito V. G., and Shaber S. G., "Neural networks in radiology: An introduction and evaluation in signal detection task", Med. Phys. 17, 234–241 (1990). This feature makes the network particularly useful for determining the energy spectra based on the shape (microdosimetric track structure) of the particle tracks in the optical memory element. A typical neural network is designated generally by reference numeral 30 in FIG. 7. The basic building block is a node (artificial neuron or processing element), represented by the circles.

Figure 7:
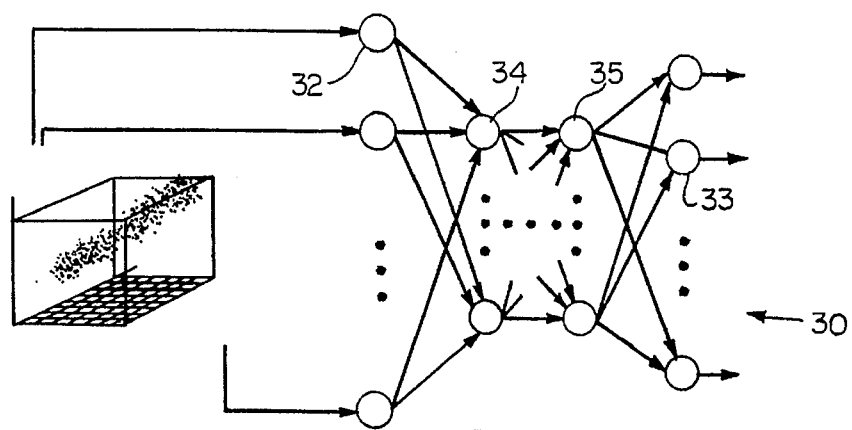
FIG. 7 is a representation of a neural network useful in carrying out the present invention.

As illustrated in FIG. 7, the network typically consists of an input-layer of processing elements 32, an output-layer of processing elements 33, and one or more hidden-layers of processing elements 34 and 35. Each link between the processing elements, shown as straight lines, carries a particular weight. The intelligence of the network resides in the values of these weights. In an asynchronous fashion, each processing element computes the sum of products of the weight of each input line multiplied by the signal level on that input line. If the sum of products exceeds a preset activation threshold, the output of the processing element typically is computed using a nonlinear function (sigmoid, for example). Learning is achieved through adjustment of the values of the weights. The value of weights are determined by presenting the network with "training material" in the form of a variety of input/output data pairs. During successive iterations through the training set, the weights are being continuously updated by a learning algorithm until the network learns to associate between the input (the structure of a track) and the appropriate output (the energy spectrum).

Several important features of neural architectures distinguish them from prior art approaches.

1. There is little or no executive function. There are only very simple units each performing its sum of products calculation. Each processing element's task is thus limited to receiving the inputs from its neighbors and, as a function of these inputs, computing an output value which it sends to its neighbors. Each processing element performs this calculation periodically, in parallel with, but not synchronized to, the activities of any of its neighbors.

2. All knowledge is in the connections. Only very short term storage can occur in the states of the processing elements. All long term storage is represented by the values of the connection strengths or "weights" between the processing elements. It is the rules that establish these weights and modify them for learning that primarily distinguish one neural network model from another. All knowledge is thus implicitly represented in the strengths of the connection weights rather than explicitly represented in the states of the processing elements.

3. In contrast to algorithmic computers and expert systems, the goal of neural net learning is not the formulation of an algorithm or a set of explicit rules. During learning, a neural network self-organizes to establish the global set of weights which will result in its output for a given input most closely corresponding to what it is told is the correct output for that input. It is this adaptive acquisition of connection strengths that allows a neural network to behave as if it knew the rules. Conventional computers excel in applications where the knowledge can be readily represented in an explicit algorithm or an explicit and complete set of rules. Where this is not the case, conventional computers encounter great difficulty. While conventional computers can execute an algorithm much more rapidly than any human, they are challenged to match human performance in non-algorithmic tasks such as pattern recognition, nearest neighbor classification, and arriving at the optimum solution when faced with multiple simultaneous constraints. If N exemplar patterns are to be searched in order to classify an unknown input pattern, an algorithmic system can accomplish this task in approximately order N time. In a neural network, all of the candidate signatures are simultaneously represented by the global set of connection weights of the entire system. A neural network thus automatically arrives at the nearest neighbor to the ambiguous input in order 1 time as opposed to order N time.

Training of the neural network may be done in various ways including, in particular, the back-propagation technique, which is described in Clark, J. W., "Neural network modeling", Phys. Med. Biol., 36, 1259–1317 (1991), and Rumelhart, David E. and McClelland, James L., "Parallel Distributed Processing", MIT Press, 1986, Volume 1, both of which are hereby incorporated herein by reference. During net training, errors (i.e., the difference between the appropriate output for an exemplar input and the current net output for that output) are propagated backwards from the output layer to the middle layer, (or layers) and then to the input layer. These errors are utilized at each layer by the training algorithm to readjust the interconnection weights so that a future presentation of the exemplar pattern will result in the appropriate output category. The back-propagation learning algorithm is based on least squares minimization of the network error defined as the difference between the actual output and the desired output.

In the present application of a neural network the input of the training pairs are the parameters describing the structures of the particle tracks and the output is the energy spectra. Those parameters may include, in particular: type of recoil particle, track length and track radius. Other track parameters associated with the details of the microdosimetric dose distribution within the track may be defined and inputted.

The input/output training sets as well as test data are generated using a Monte Carlo simulation technique. A three-dimensional realistic simulation package is developed to obtain detailed computer simulation of how high LET particles are transported through the ORAM material. The simulation package will be based on the formalism developed by Zaider et al., which is described in Zaider M., Benner D. J. and Wilson W. E., "The Application of Track Calculations to Radiobiology. I. Monte carlo Simulation of Proton Tracts", Rad. Res. 95, 231–247 (1983), hereby incorporated herein by reference. The Monte Carlo simulation is performed in three steps: (1) generation of the tracks, including geometrical coordinates of interaction points, energy deposition and type of event; (2) generation of primary electrons resulting from interaction of the high LET particles with the medium; and (3) to transport electrons in the medium to simulate the radial dose distribution in the particle track. The calculations can be applied to the variety of heavy ions types and energies. The Monte Carlo results are used to develop the energy discrimination algorithm by training the neural network.

The neural network and the Monte Carlo simulation are implemented on, for example, a SUN workstation or other suitable computing device, including commercially available neurocomputer accelerator boards.

Dose distributions can be calculated for several radiation types and energies using published data, including 0.3–20 MeV protons, 930 MeV $^4$He and 41 MeV $^{16}$O ions. See Wingate C. L. and Baum, J. W., "Measured Radial Distribution of Dose and LET for Alpha and Proton Beams in Hydrogen and Tissue-Equivalent Gas", Rad. Res., 65 1–19 (1976), Varma M. N., Baum J. W., and Kuehner A. V., "Radial Dose, LET, and W for $^{16}$O Ions in $N_2$ and Tissue-Equivalent Gases", Rad. Res. 70, 511–518 (1977); Wilson W. E., Metting N. F. and Paretzke H. G., "Microdosimetric Aspects of 0.3- to 20 MeV Proton Tracks", Rad. Res. 115, 389–402 (1988), and Varma M. N. Paretzke H. G., Baum J. W., Lyman J. T., and Howard J., "Dose as a Function of Radial Distance From a 930 MeV $^4$He Ion Beam", In Proc. 5th Symp. Microdosimetry, Sep. 22–26, 1975 (EUR 5452 d-e-f-). The track, in first approximation can be described as a cylindrical-shaped region of excitations and ionizations. The radial dose distribution within the track can be calculated based on published experimental data in tissue equivalent gas. To calculate the simulated radial distance (r') and the radial dose distribution D(r') in the ORAM material, the following transformation can be applied (see Varma et al. supra):

$$r'=r\{[(S/\rho)\rho]_{gas}/[(S/\rho)\rho]_{ORAM}\} \quad (1)$$

and $$D(r')=D_{gas}(r)\{[(Z/A)(S/\rho)]_{ORAM}/[(Z/A)(S/\rho)]_{gas}\}(\rho_{ORAM}/\rho_{gas})^2 \quad (2)$$

where $S/\rho$ is the mass stopping power, $\rho$ is the density and Z and A are the atomic and mass number of the target material, respectively.

Next, the "bit-flip" probability in response to high LET particles can be calculated. The particle interacting with the ORAM material causes the local temperature to increase, as a result of energy dissipation. Preliminary results have shown temperature increase of up to 95° C. inside 1 MeV proton tracks. Since it is known that ORAM are temperature sensitive, this temperature increase is expected to change the information originally written (cause "bit-flips"). The amount and spatial distribution of those bit-flips can be calculated, as follows: (1) calculation of the temperature distribution within the particle tracks based on the calculated dose distribution, and (2) theoretical analytical calculation of the distribution of "bit-flips" as a function of energy, temperature and time, it can be assumed that the number of "bit-flips" follows first order kinetics, i.e.:

$$N(t)=N_o(1-e^{-kt}) \quad (3)$$

where N(t) is the number of "bit-flips" at the time t, $N_o$ is the initial concentration of bits in the "read" form, and k is the rate constant. To consider the effect of temperature on the rate of bit transformation, the Arrhenus rate equation is used:

$$k(T) = \sum_i A_i e^{-E_i/RT} \quad (4)$$

where A is a factor which is only slightly temperature dependent and will be assumed to be constant, and E is the difference in the energy between the two molecular states. Calculations based on track structure theory (TST) to predict the response of 3-D ORAM to proton radiation in the energy range 1–3 MeV have been made. The results show that (1) the probability of proton induced bit-flips is up to three orders of magnitude higher than the probability of spontaneous bit-flips at room temperature, and (2) the probability of room temperature spontaneous bit-flips (i.e. not induced by radiation) increases as a function of time since the bits were written.

The 3-D ORAM material that was studied, is composed of a polymethylmethacrylate (PPMA) matrix, that contains 1% by weight spirobenzopyran as photochromic molecule. The spiropyran molecule can be excited into merocyanine form by the simultaneous absorption of either a 1064 nm photon and 532 nm photon, or two 532 nm photons. The merocyanine molecule is exited by absorption of two 1064 nm photons followed by de-excitation and emission of red-shifted fluorescence, returning to the spiropyran form. Equations (3) and (4) were applied, using the parameters given by Parthenopoulos et al., supra, to calculate the rate of conversion of the merocyanine form to spiropyran form. The values of the parameters $A_i$ and $E_i$ in Equation (4) were calculated based on data given by Gardlund et al. Gardlund Z. G., and Laverty J. J., "Polyalkylmethacrylate Films as Matrices for Photochromic Studies", Journal of Polymer Science, Polymer Letters 7 719 (1969). The change of the photochromic molecule (spirobenzopyran) between its two isomeric forms records a bit-flip. The interaction of ionizing radiation with the material will cause bit-flips by causing the transformation of the merocyanine form of the molecule back to its spiropyran form. The radial distributions of the bit-flip probability along the tracks of 1 and 3 MeV protons were calculated and compared to the background bit-flip probability (bit-flips that are not induced by radiation). The theoretical calculations were applied to the experimental results of Wingate et al., supra, who measured the radial dose distribution for 1 and 3 MeV protons in tissue-equivalent gas. The radial temperature increase along the proton track was calculated using the heat capacity of the material, and the radial dose distribution.

The probability of radiation induced bit-flip was compared to the noise of the system, i.e., the probability that a bit-flip will occur spontaneously (not induced by radiation). The results clearly demonstrate that significant radiation induced bit transformation probability is predicted. The radiation induced bit-flip probability can be by three orders of magnitude higher than the probability of spontaneous bit-flip. These probabilities are expected to increase with the atomic number Z of the incident particle, even for much higher energies typical to space radiation environments.

It is expected therefore that a high LET dosimeter based on SP will be sensitive to low dose levels. A potential problem was identified where the probability of room temperature spontaneous bit-flips (i.e. not induced by radiation) increases as a function of time since the bits were recorded (fading). The room temperature fading seems to be a limitation of the SP material. It is not expected however that this limitation will prevent this material from being used as a high LET dosimeter. A ORAM dosimeter can in principle be thermoelectrically cooled and used as passive integrating dosimeter even at elevated temperature.

Other types of photochromic materials may be selected, as in an effort to reduce the fading effects and eliminate any need to thermoelectrically cool the material. Other materials include photochromic fulgide, Parthenopoulos, D. A. and Rentzepis P. M., "Two-Photon Volume Information Storage in Doped Polymer Systems", J. Appl. Phys. 68, 5814–5818 (1990), and spyropyran and other molecules considered as candidates for optical 3D storage memory, such as those described in Malkin J., Dvornikov A. S., Straub K. D., and Rentzepis P. M., "Photochemistry of Molecular Systems for Optical 3D Storage Memory", Res. Chem. in. 19, 159–189 (1993), which paper is hereby incorporated herein by reference.

Neutron Spectrometer

Figure 8:
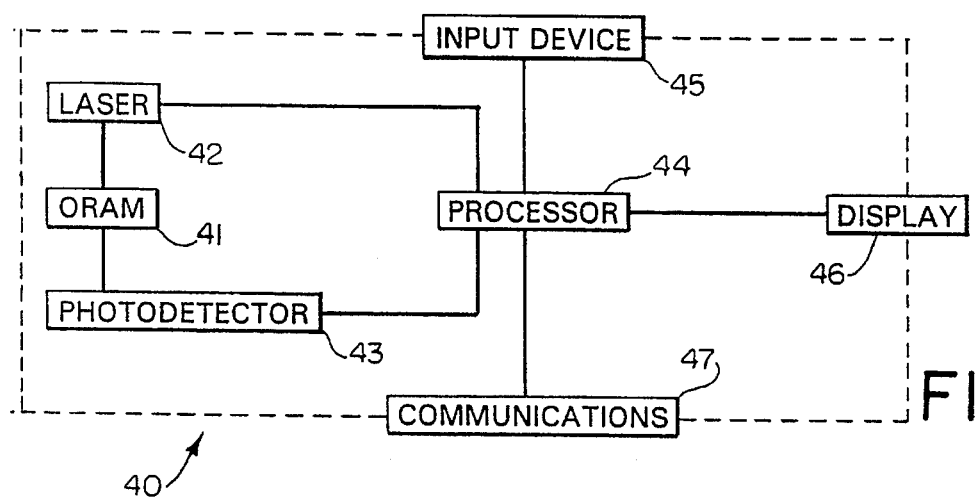
FIG. 8 is a diagrammatic illustration of a neutron spectrometer according to the present invention.

Referring now to FIG. 8, a spectrometer for measuring incident radiation, such as neutron radiation, is designated generally by reference numeral 40. The spectrometer 40 comprises an optical memory element 41, a laser assembly 42, a photodetector assembly 43 (including, for example, a photodiode array, a CCD device, or the like), a processor 44 and associated computing elements such as ROM and RAM, an input device 45, a display 46, and a communications port 47. Although not shown, the spectrometer includes other conventional devices including a power supply such as a battery with an optional connection to AC power if desired, and a housing represented by broken lines 49 for containing the various components of the spectrometer preferably in a compact, lightweight and easily carried package. The optical memory element preferably is disposed in the housing so as to be responsive to the radiation to be measured by the spectrometer. An erasing/resetting device, such as a heating element, may also be provided for bulk erasure.

The optical memory element 41, laser assembly 42 and photodetector assembly 43 function generally as described in the above referenced Hunter et al. paper which describes a system for writing and reading ORAM. The read/write functions of the laser and photodetector assemblies are controlled by the processor 44 that may be a conventional programmable microprocessor of any suitable type. The processor preferably operates under a program that reads the optical memory element preferably repetitively at a desired frequency to obtain real time measurement of the radiation field being monitored. The three dimensional data is processed by the processor, as through use of a neural net, to obtain the energy spectrum (intensity v. energy), absorbed dose and/or energy. Dose equivalent may be calculated from the absorbed dose and energy as above discussed, and the dose equivalent, absorbed dose and/or energy spectrum may be displayed on the display 46. The processor also controls resetting of the optical memory element as upon initiation of a new scanning operation, which may be effected by pushing a start button of the input device 45. The display may be periodically or continuously updated as radiation is accumulated. The dose rate and dose equivalent may also be provided. In this manner monitoring of neutron (or other) radiation may be obtained.

The spectrometer may be provided with one or more memory storage devices for storing the measured radiation data. The stored data may be downloaded to other devices as desired for further processing by conventional devices such as via communications port 47. Other output devices may be provided as desired such as a printer port for direct printing of data or other information to a printer. The input device 45, for example, a keypad or keyboard, is provided to provide a human/processor interface for initiating commands, inputting data, responding to inquiries posed by the processor, etc.

Real-Time Electronic Dosimeter

Figure 9:
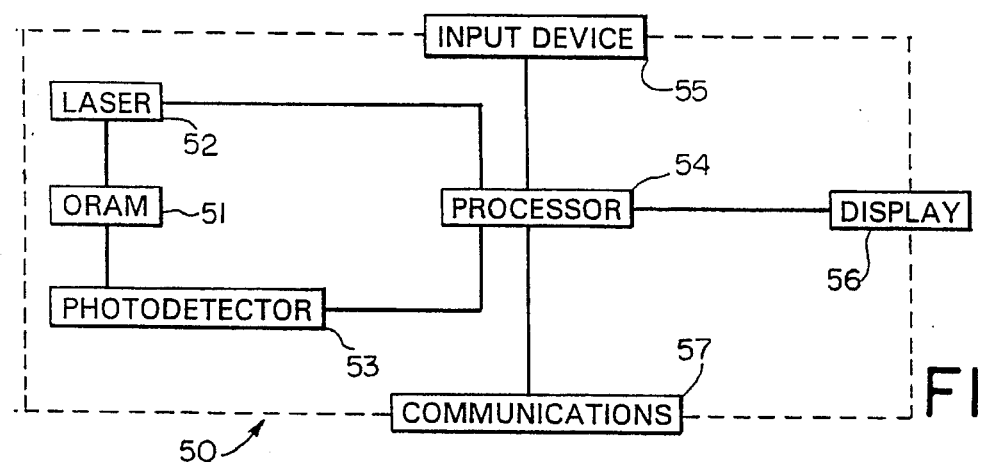
FIG. 9 is a diagrammatic illustration of a real time electronic dosimeter according to the present invention.

Referring now to FIG. 9, a real-time dosimeter for measuring incident radiation, such as neutron radiation, is designated generally by reference numeral 50. The dosimeter 50 comprises an optical memory element 51, a laser assembly 52, a photodetector assembly 53, a processor 54 and associated computing elements such as ROM and RAM, an input device 55, a display 56, and a communications port 57. Although not shown, the dosimeter includes other conventional devices including a power supply such as a battery and a case represented by broken lines 49 for containing the various components of the dosimeter. The dosimeter preferably is of small size and weight on the order of a common pager that may be easily carried in a pocket, worn on a belt, carried on a chain around one's neck, etc. The optical memory element preferably is disposed in the casing so as to be responsive to the radiation to be monitored.

The laser assembly 52 necessarily must be a miniaturized assembly using, for example, diode lasers of the type commonly used in compact disc players, or the like. However, the optical memory element 51, laser assembly 52 and photodetector assembly 53 would still function generally as described in the above referenced Hunter et al. paper which describes a system for writing and reading ORAM. The read/write functions of the laser and photodetector assemblies are controlled by the processor 54 that may be a conventional programmable microprocessor of any suitable type. The processor preferably operates under a program that repetitively reads the optical memory element at a desired frequency to obtain real time measurement of the radiation field being monitored. The three dimensional data is processed by the processor, as through use of a neural net, to obtain absorbed dose and energy. Dose equivalent may be calculated from the absorbed dose and energy as above discussed, and the calculated dose equivalent, absorbed dose, dose rate and/or energy (such as average energy) may be displayed on the display 56. The processor also controls periodic refreshing of the optical memory element, whether after each read or otherwise. In this manner real time monitoring of neutron (or other) radiation may be obtained.

The dosimeter may be provided with one or more memory storage devices for storing the measured radiation data. The stored data may be downloaded to other devices as desired for further processing by conventional devices such as via communications port 57. Other output devices may be provided as desired such as a printer port for direct printing of data or other information to a printer. The input device 55, which may be a keypad, is provided to provide a human/processor interface for initiating commands, inputting data, responding to inquiries posed by the processor, etc.

Although the invention has been shown and described with respect to certain preferred embodiments, equivalent alterations and modifications will no doubt occur to others skilled in the art upon the reading and understanding of this specification. Moreover, while a particular feature of the invention has been described with respect to only one or less than all of the illustrated embodiments, such feature may be combined with one or more features of the other embodiments, as may be desired and advantageous for any given or particular application. The present invention includes all such equivalent alterations and modifications, and is limited only by the scope of the following claims.

What is claimed is:

1. A high LET radiation dosimetry method comprising the steps of storing information in a three dimensional optical memory element having a plurality of memory locations by exciting the memory locations from a first energy state to a second energy state, exposing the optical memory element to high LET radiation to alter the information stored in the optical memory element as a function of the radiation to which the optical memory element is exposed, the excited memory locations reverting from their second energy state to their first energy state through localized interactions between the radiation and molecules composing the optical memory element, retrieving the altered information from the optical memory element for subsequent analysis by reading the memory locations to determine the spatial distribution of the memory locations that have reverted to their first energy state, analyzing the altered information retrieved from the optical memory element to extract radiation dose information therefrom, said analyzing step including using a neural network computer apparatus for determining the radiation energy as a function of the spatial distribution of the memory locations that have reverted to their first energy state.

2. A method as set forth in claim 1, wherein the optical memory element comprises a volume of a transparent polymer doped with a light sensitive chemical dopant molecule.

3. A method as set forth in claim 2, wherein the light sensitive chemical dopant is spirobenzopyran.

4. A method as set forty in claim 1, wherein said optical memory device is substantially composed of hydrogen and carbon.

5. A method as set forth in claim 1, wherein the retrieving step includes reading the memory locations to determine the number of the memory locations that have reverted to their first energy state, and the analyzing step includes determining the radiation dose as a function of the number of the memory locations that have reverted to their first energy state.

6. A method as set forth in claim 1, wherein the retrieving step includes using two-photon absorption to read the memory locations.

7. A method as set forth in claim 1, wherein the storing step includes using two-photon absorption to write the memory locations by exciting them to their second energy state.

8. A method as set forth in claim 1, wherein said high LET radiation is neutron radiation.

9. A method as set forth in claim 1, wherein said high LET radiation is proton radiation.

10. An apparatus comprising a three dimensional optical memory element having a plurality of memory locations that may be written from a first energy state to a second energy state, and which memory locations become altered by reversion from their second energy state to their first energy state through localized interactions between incident radiation and molecules composing the optical memory element, means for reading the optical memory element to retrieve therefrom information altered through interaction with incident radiation, means for analyzing the altered information retrieved from the optical memory element to extract radiation dose information therefrom, and means for displaying the dose information extracted from the optical memory element.

11. A apparatus as set forth in claim 10 wherein said means for analyzing includes a neural network computer apparatus for determining the radiation energy as a function of the spatial distribution of the memory locations that have reverted to their first energy state.

12. An apparatus as set forth in claim 10, wherein said means for analyzing includes means for determining both radiation dose and energy.

13. An apparatus as set forth in claim 10, wherein the optical memory element comprises a volume of a transparent polymer doped with a light sensitive chemical dopant molecule.

14. An apparatus as set forth in claim 13, wherein the light sensitive chemical dopant is spirobenzopyran.

15. An apparatus as set forth in claim 10, wherein said optical memory device is substantially composed of hydrogen and carbon.

16. A real time dosimeter comprising the apparatus of claim 10, wherein the dose information is displayed on a real-time basis.

17. A spectrometer comprising the apparatus of claim 10, wherein radiation dose and energy are displayed on a real-time basis.

* * * * *